United States Patent [19]

Hazne

[11] 3,952,886

[45] Apr. 27, 1976

[54] ARRANGEMENT FOR STABILIZING AN AIRCRAFT DURING LOADING AND UNLOADING OPERATIONS

[76] Inventor: Edis Hazne, 9000 Pleasantview Drive, Northfield, Ohio 44067

[22] Filed: Mar. 10, 1975

[21] Appl. No.: 557,148

[52] U.S. Cl. .............................. 214/38 BA; 14/71 A; 244/137 R

[51] Int. Cl.² .............................. B65G 67/00

[58] Field of Search ..................... 214/38 B, 38 BA; 244/137 R; 14/71 R, 71 A

[56] References Cited

UNITED STATES PATENTS 3,263,832 8/1966 Williams et al. ................ 214/38 BA 3,599,262 8/1971 Carder et al. .............. 214/38 BA X

*Primary Examiner*—Robert G. Sheridan

[57] ABSTRACT

An arrangement including a structure on which is mounted cargo conveying equipment capable of being raised and lowered. Mounted on the conveying equipment is a longitudinally movable support bar having an upwardly disposed hook formed in one end for releasably engaging a transfer member from which is suspended a stabilizing weight. The transfer member can be transferred to and from a hook mounted in the nose of an aircraft positioned adjacent the conveying equipment structure to effect the transfer of the stabilizing weight from the hook in the support bar to the hook in the aircraft and vice versa by the raising and lowering of the conveying equipment.

6 Claims, 3 Drawing Figures

ARRANGEMENT FOR STABILIZING AN AIRCRAFT DURING LOADING AND UNLOADING OPERATIONS

This invention relates to apparatus useful in facilitating the loading and unloading of cargo through the nose opening of an aircraft.

Increased shipment of cargo by aircraft has led to the development of various types of material handling apparatus to facilitate the unloading and loading operations of such aircraft. Typically such unloading and loading operations are accomplished by transferring large heavy cargo containers from the aircraft interior, through an opening in the nose of the aircraft onto the load platform of the material handling apparatus and vice versa. To accomplish the cargo transfer effectively it is desirable that the load platform of the material handling apparatus be coplaner with the load supporting platform of the aircraft and arrangements are provided to initially set the two platforms in the same plane. However movement of the heavy cargo within the aircraft i.e. from a position in the tail to a position in the nose causes a movement in the aircraft thereby misaligning the two platforms delaying the loading and unloading operation and possibly resulting in damage to the aircraft, cargo or the load transfer apparatus.

To alleviate the problem it is suggested to suspend weights from a hook mounted in the nose of the aircraft in order to stabilize the aircraft as the cargo is moved within the aircraft during loading and unloading operations. However, to accomplish their purpose such weights must be heavy thereby requiring additional equipment to transfer the weights from storage and to suspend them from the aircraft hook. Further when suspended from the aircraft such massive weights offer hazards to personnel or other apparatus in the area. In addition it is desirable to provide convenient storage means for the stabilizing weights during periods when they are not suspended from the aircraft.

It is an object of this invention to provide apparatus for suspending a stabilizing weight from a hook mounted in the nose opening of an aircraft positioned adjacent a structure on which is mounted cargo conveying equipment which transfers cargo to and from the aircraft.

It is a further object of this invention to provide simplified and inexpensive apparatus by which a stabilizing weight can be suspended from an aircraft positioned adjacent the cargo conveying equipment during cargo transfer to or from the aircraft and then removed from the aircraft and conveniently stored in the structure on which the conveying equipment is mounted.

A feature of the invention is that a transfer member from which the stabilizing weight is suspended is engaged by the hook of the aircraft and simultaneously is released from a hook formed at one end of a support bar mounted on the cargo conveying equipment as a result of the downward movement of the support bar from a position above the aircraft hook to a position below it and conversely is engaged by the hook of the support bar and simultaneously is released by the hook of the aircraft as a result of the upward movement of the support bar from a position below the hook of the aircraft to a position above it thereby respectively transferring the stabilizing weight from the support bar to the aircraft and vice versa.

Another feature of the invention is that a sleeve is fastened to the structure on which said conveying equipment is mounted. This sleeve covers the stabilizing weights to provide against hazards to personnel.

In accordance with the invention an arrangement has been provided to transfer a stabilizing weight to a hook mounted in the nose of an aircraft positioned adjacent conveying equipment for loading or unloading aircraft cargo. The conveying equipment and its hoisting means by which it is raised and lowered form a part of the arrangement of the invention. Also included in the arrangement are a support bar having an upwardly disposed hook formed at one end and motive means connected to the support bar capable of extending the longitudinally movable support bar beyond one end of the conveying equipment on which it is mounted. Additionally there is provided a transfer member from which is suspended a stabilizing weight. The transfer member has a first end releasably engaged with the hook of the support bar and a second end releasably engageable with the hook of the appropriately disposed aircraft whereby the transfer member can be engaged with the hook of the aircraft by raising the conveying equipment and extending the support bar until the transfer member is suitably positioned above the hook on the aircraft and then by lowering the conveying equipment until the transfer member engages the hook on the aircraft and is released from the hook of the support bar thereby transferring the stabilizing weight from the support bar to the aircraft.

Additional objects, features and advantages of the invention will be apparent from the following description and the appended claims when considered in conjunction with the accompanying drawing in which like parts are indicated by like symbols throughout the figures and where:

Figures 1, 2, 3:
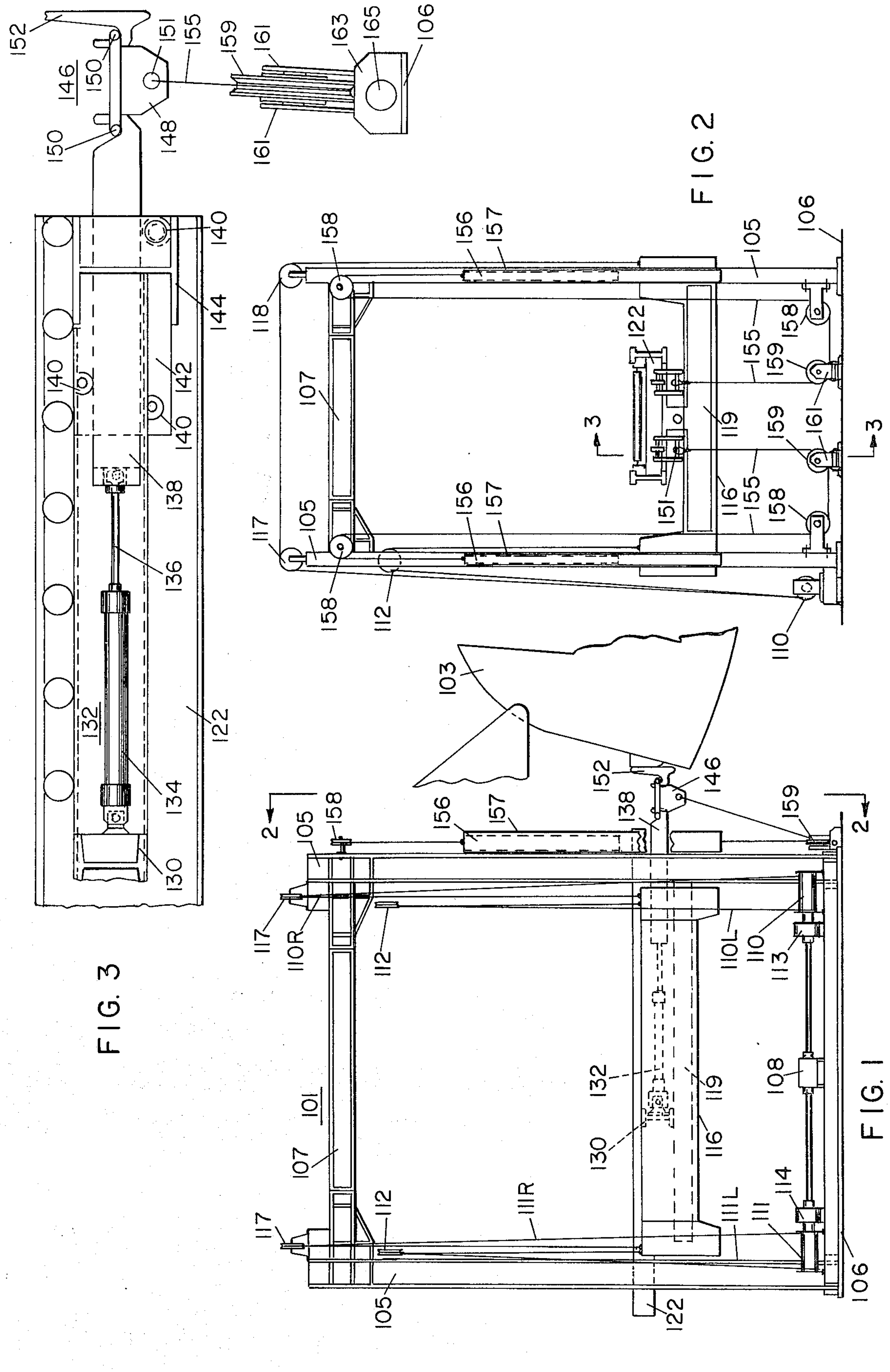
FIG. 1 is a simplified side elevation of the cargo conveying equipment and its structure illustrating the arrangement of the invention.
FIG. 2 is a simplified view taken along lines 2—2 of FIG. 1.
FIG. 3 is a simplified enlarged section of FIG. 2 taken along the lines 3—3.

Referring now to the drawing, illustrated in FIG. 1 is a structure 101 for transferring cargo to and from aircraft 103 through an opening in its nose. This structure and the conveying equipment mounted on it are more specifically described in copending Application Serial No. 523,935, now U.S. Pat. No. 3,913,757, for CONTROL SYSTEM FOR LOAD CARRIER AND ASSOCIATED TRANSFER APPARATUS, filed in the name of George Leslie Lovey on Nov. 14, 1974 and assigned to the assignee of this application.

Structure 101 includes a main frame comprising four upright supports 105 each bolted in a suitable manner to floor 106 of the building in which the structure is installed. Connected securely to the top of upright supports 105 is an upper support frame 107. Mounted on floor 106 adjacent the left hand side of structure 101 as viewed in FIG. 2, is suitable hoisting machinery comprising hoisting motor 108 and front and rear hoisting drums 110 and 111. The shaft of motor 108 is connected to drive drums 110 and 111 through suitable gear reduction units 113 and 114, respectively.

Hoisting drums 110 and 111 are each cut with both right hand and left hand rope grooves to accommodate a pair of hoisting ropes 110L, 110R and 111L, 111R respectively. One of the hoisting ropes of each of the drums (ropes 110L and 111L) is paid around a sheave 112 (FIG. 2) suspended from the front and rear of the bottom of upper frame 107 on the left hand side thereof. Each of these ropes is terminated in a dead-end hitch on the left hand side of hoisting frame 116 which constitutes part of the cargo conveying equipment. The other hoisting rope on each drum (ropes 110R and 111R) is paid around a pair of sheaves, 117 and 118, (FIG. 2) mounted one above each side of upper frame 107. Each of these ropes is terminated in a dead-end hitch on the right hand side of hoisting frame 116. Hoisting frame 116 is supported from structure 101 in any suitable manner, such as on guide rails (not shown) fastened to uprights 105, which will permit it to be raised and lowered by the appropriate rotation of hoisting drums 110 and 111.

A pitch frame 119, which also forms part of the cargo conveying equipment is suitably mounted inside hoisting frame 116. Also comprising part of the cargo conveying equipment is roll frame 122 which is longer than pitch frame 119 and is suitably mounted atop that frame. Conveyors of the roller type and other varieties are mounted on roll frame 122 as more fully described in the forementioned Application Ser. No. 523,935.

Illustrated in FIG. 2 are constructed embodiments of the invention shown on both the right hand and left hand sides of that figure. Only the arrangement shown on the left hand side of FIG. 2 will be described hereinafter, it being understood that it would be redundant to describe the independently operated arrangement shown on the right hand side of that figure.

Suitably attached to and supported from a first cross member 130 (FIGS. 1 and 3) of roll frame 122 is hydraulic motor 132 comprising two chamber cylinder 134 and double acting piston 136. Cylinder 134 is hydraulically connected to a hydraulic control valve (not shown) which regulates the flow of fluid from a hydraulic pump (not shown) to cylinder 134 in any suitable manner. Support bar 138 having an upwardly disposed hook formed in one end is mechanically fastened to double acting piston 136 and is supported for longitudinal movement by upper and lower guide rollers 140. Parallel plates 142 on which guide rollers 140 are rotatably mounted are suitably supported by a second cross member 144 of roll frame 122, shown as an I-beam in FIG. 3. A section of the web of I-beam 144 is removed to form a slot through which support bar 138 passes.

Also shown in FIG. 3 is transfer member 146 constructed from a pair of shaped parallel plates 148 suitably joined by three cylindrical bars. Two of the bars 150 are shown engaged by upwardly disposed hook of support bar 138 and upwardly disposed hook 152 mounted in the nose opening of aircraft 103 (FIG. 1).

Suspended from third cylindrical bar 151 of transfer member 146 by wire rope 155 is stabilizing weight 156 shown in FIG. 1 positioned inside sleeve 157 suitably fastened to upright support 105. Wire rope 155 comprises a suspension means and is suitably connected to both cylindrical bar 151 of transfer member 146 and stabilizing weight 156. Wire rope 155 is paid around sheaves 158 which are suitably supported at the top and bottom of upright support 105 as shown in FIG. 2. It also passes around sheave 159 shown in FIG. 3 to be suitably supported by sheave supports 161. Sheave supports 161 are pivotally connected by pin 165 to pillow block 163 which is suitably bolted to floor 106.

It is to be understood that whereas the invention is sufficiently disclosed to enable those skilled in the art to practice it, for the purpose of brevity the arrangement described herein is simpler than that employed in a commercial installation upon which the disclosure is based.

To more fully appreciate the invention and the manner in which the constructed embodiment operates assume that aircraft 103 has been positioned within a predetermined distance of the aircraft end of structure 101, as described more fully in Application Ser. No. 523,935. In practice this predetermined distance is such that when the nose of the aircraft is opened hooks 152 located therein are appropriately disposed with respect to the pair of transfer members 146 suspended from the respective pair of retracted support bars 138.

Assume now that power is applied to the hoisting machinery and that a load transfer operator manually actuates the hoisting equipment to raise hoisting frame 116. This may be accomplished in any suitable manner such as by closing a switch causing the shaft of hoisting motor 108 to transmit a rotational torque to hoisting drums 110 and 111 through gear reduction units 113 and 114. Consequently hoisting ropes 110R, 110L, 111R and 111L are wound around the hoisting drums thereby raising hoisting frame 116, pitch frame 119 and roll frame 122 vertically to a position above the location of the hooks attached to the aircraft at which position the operator releases the switch thereby stopping the hoisting motor. As a result roll frame 122 raises support bar 138 the hooked end of which is engaged with first cylindrical bar 150 of transfer member 146 which is also raised. As transfer member 146 is raised it raises stabilizing weight 156 which is suspended from the transfer member by wire rope 155.

To transfer the stabilizing weight from support bar 138 to aircraft hook 152, the operator actuates a hydraulic valve (not shown) to cause hydraulic fluid to flow from a pump (also not shown) to cylinder 134 of hydraulic motor 132 to cause the piston to be extended. The piston thereby causes the extension of support bar 138. This extension continues until second cylindrical bar 150 of transfer member 146 is vertically above upwardly disposed hook 152 of the aircraft at which position the operator closes the hydraulic valve to stop motor 132.

Hoisting motor 108 is then actuated to rotate the hoisting drum in a direction to unwind the hoisting ropes. Hoisting frame 116 supporting pitch frame 119 and roll frame 122 in which support bar 138 is mounted are thereby lowered vertically and move from a position above aircraft hook 152 to a position below that hook at which position the hoisting motor is stopped. As the transfer member is lowered by the downward movement of the support bar the second cylindrical bar 150 of the transfer member is engaged by upwardly disposed aircraft hook 152 and simultaneously its first cylindrical bar 150 is released from the upwardly disposed hook formed on the end of the support bar 138. As a result the transfer member and the stabilizing weight suspended therefrom are thereby suspended from the aircraft hook. The support bar is then returned to its recessed position by actuating the hydraulic valve to operate the hydraulic motor to retract its piston and the attached support bar. The valve is then released to stop the motor. In a similar manner the stabilizing weight 156 located to the right of the transfer apparatus as shown in FIG. 2 is transferred to the second aircraft hook.

Although not described it is to be understood that a reversal of the foregoing operation would effect the transfer of the stabilizing weights from the hooks mounted on the aircraft to the hooks formed on the support bars.

It is apparent that various modifications of the above will be evident to those skilled in the art and that the arrangement described herein is for illustrative purposes and is not to be considered restrictive.

What is claimed is:

1. An arrangement for use with aircraft having a nose opening through which cargo can be loaded and unloaded, said arrangement being operable to suspend a stabilizing weight from a hook mounted in the nose opening of each such aircraft, including, conveying equipment for transferring cargo through the nose opening of an aircraft appropriately positioned adjacent one end of said conveying equipment;

hoisting means for raising and lowering said conveying equipment;

a support bar having an upwardly disposed hook formed in one end, said support bar being mounted for longitudinal movement on said conveying equipment with its hooked end being disposed at said one end thereof;

motive means mounted on said conveying equipment and connected to said support bar said motive means being capable of extending said support bar beyond said one end of said conveying equipment;

a transfer member having a first end releasably engageable with the hook of said support and a second end releasably engageable with the hook on an aircraft appropriately positioned as aforesaid; and means suspending said stabilizing weight from said transfer member, whereby upon an aircraft being appropriately positioned as aforesaid and upon said stabilizing weight being suspended from said one end of said transfer member, said weight can be suspended from the hook on said aircraft by raising said conveying equipment and extending said support bar until said second end of said transfer member is suitably positioned above the hook on said aircraft and by lowering said conveying equipment until said second end of said transfer member engages the hook on said aircraft and said first end of said transfer member is released from the hook on said support bar.

2. An arrangement according to claim 1, wherein said motive means includes a motor, a two chamber hydraulic cylinder mounted on said conveying equipment and a double acting piston mounted in said cylinder and mechanically fastened to said support bar, said piston being operable to extend or retract said support bar in response to the flow of hydraulic fluid into one or the other chamber of said cylinder, respectively.

3. An arrangement according to claim 2, wherein a set of guide rollers is mounted on said conveying equipment to facilitate the longitudinal movement of said support bar.

4. An arrangement according to claim 3, wherein the means by which said stabilizing weight is suspended from said transfer member includes a wire rope fastened at one end to stabilizing weight and at the other end to said transfer member, a set of sheaves mounted on said conveying equipment around which said wire rope passes and a floor mounted block having a pivotally supported sheave around which said wire rope also passes.

5. An arrangement according to claim 4, wherein said conveying equipment includes an upright support having a sleeve fastened thereto, said stabilizing weight being vertically movable in said sleeve.

6. An arrangement according to wherein w herein a pair of said support bars, motive means, transfer members and stabilizing weights are combined with said conveying equipment.

* * * * *